(12) United States Patent
Bourgois et al.

(10) Patent No.: US 11,840,994 B2
(45) Date of Patent: Dec. 12, 2023

(54) MULTIPOINT FUEL INJECTION DEVICE

(71) Applicant: SAFRAN AIRCRAFT ENGINES, Paris (FR)

(72) Inventors: Sébastien Alain Christophe Bourgois, Moissy-Cramayel (FR); Romain Nicolas Lunel, Moissy-Cramayel (FR); Haris Musaefendic, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 102 days.

(21) Appl. No.: 16/517,863

(22) Filed: Jul. 22, 2019

(65) Prior Publication Data
US 2020/0032749 A1 Jan. 30, 2020

(30) Foreign Application Priority Data
Jul. 25, 2018 (FR) ...................................... 1856930

(51) Int. Cl.
*F02M 55/00* (2006.01)
(52) U.S. Cl.
CPC ................. *F02M 55/008* (2013.01)
(58) Field of Classification Search
CPC ....... F02M 55/008; F23R 3/283; F23R 3/343; F23R 2900/00016; F23R 3/34; F23R 3/002; F12D 11/36
See application file for complete search history.

(56) References Cited

U.S. PATENT DOCUMENTS

| 4,918,925 | A | * | 4/1990 | Tingle | F02C 7/228 60/739 |
| 5,321,949 | A |  | 6/1994 | Napoli et al. | |
| 5,701,732 | A | * | 12/1997 | Nesbitt | F23R 3/343 60/776 |
| 2004/0148937 | A1 | * | 8/2004 | Mancini | F23R 3/343 60/740 |
| 2007/0169486 | A1 | * | 7/2007 | Hernandez | F23R 3/286 60/737 |
| 2009/0256003 | A1 | * | 10/2009 | McMasters | B23P 6/005 239/128 |
| 2012/0228397 | A1 | * | 9/2012 | Thomson | F23R 3/343 239/13 |

(Continued)

FOREIGN PATENT DOCUMENTS

FR   2951245 B1   5/2013
GB   2210446 B    6/1989

OTHER PUBLICATIONS

Search Report issued in French Patent Application No. 1856930 dated Mar. 13, 2019.

*Primary Examiner* — Edwin Kang
(74) *Attorney, Agent, or Firm* — Pearne & Gordon LLP

(57) ABSTRACT

The fuel injection conduits in a multipoint device surrounding a so-called pilot central injection device include tubes of circumferential orientation. By separating the injection conduits from each other, it is possible to attribute to them different head losses which compensate the differences in length that the fuel has to travel: a uniform flow of fuel may be hoped for, for each of the injection holes. The tubes are individual but joined to form a crown that is unitary or composed of two almost symmetrical unitary portions, which lends itself well to manufacture by addition of material.

8 Claims, 3 Drawing Sheets

(56) References Cited

U.S. PATENT DOCUMENTS

Figure 3:
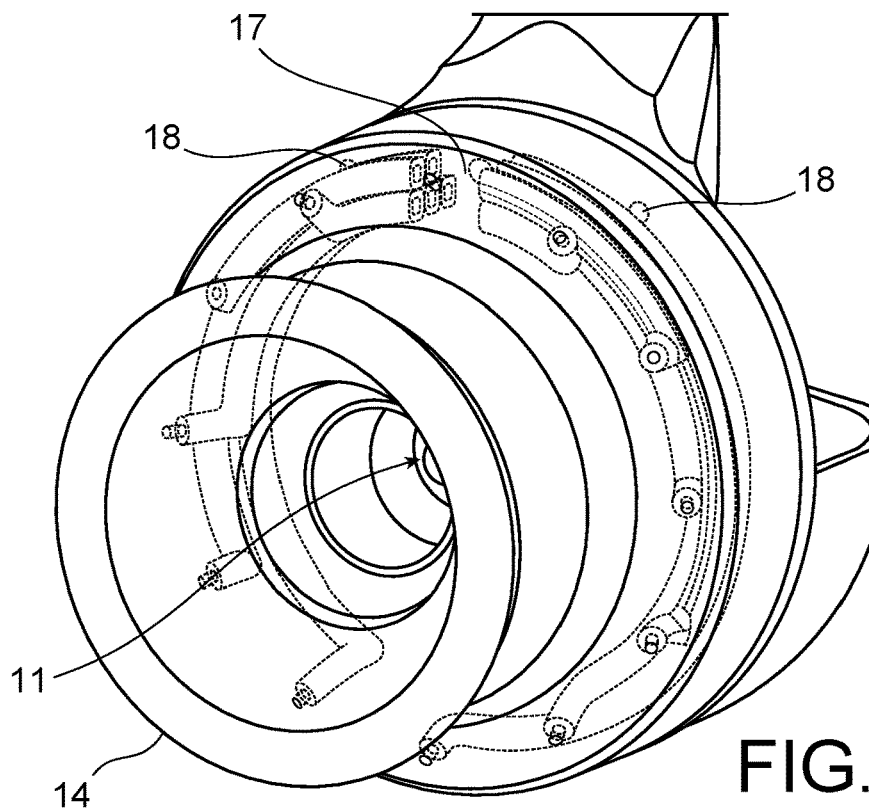
Figure 4:
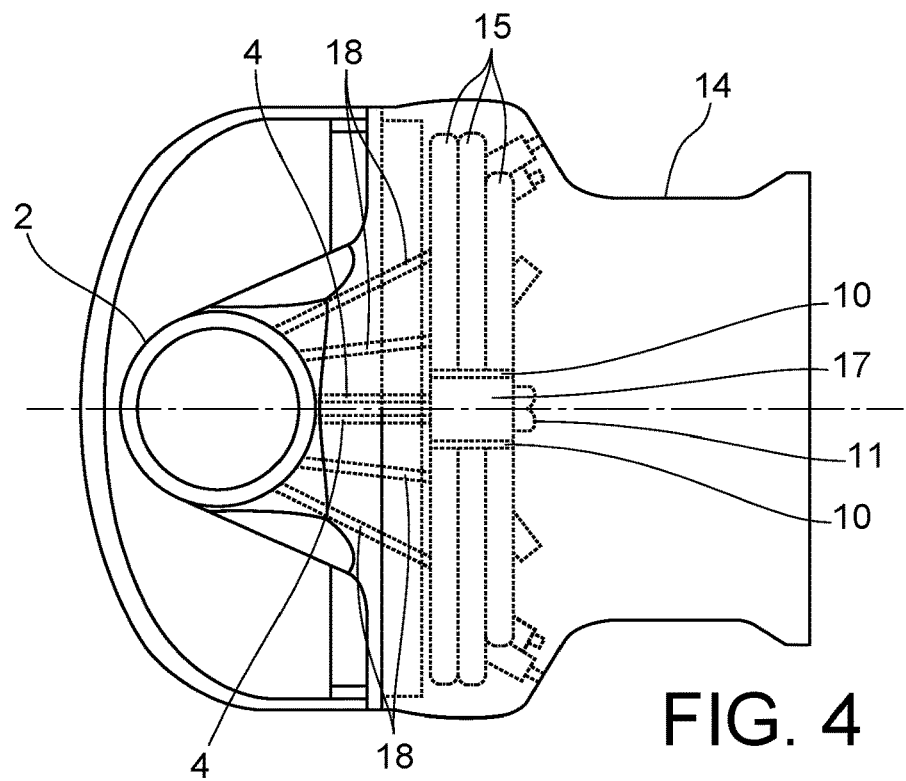

2014/0291418 A1   10/2014  Ruffing et al.
2016/0305327 A1* 10/2016  Patel .......................... F23R 3/14
2017/0003029 A1    1/2017  Mook et al.
2017/0037783 A1*  2/2017  Ryon ....................... F23R 3/346
2017/0321901 A1   11/2017  Matsuyama et al.

* cited by examiner

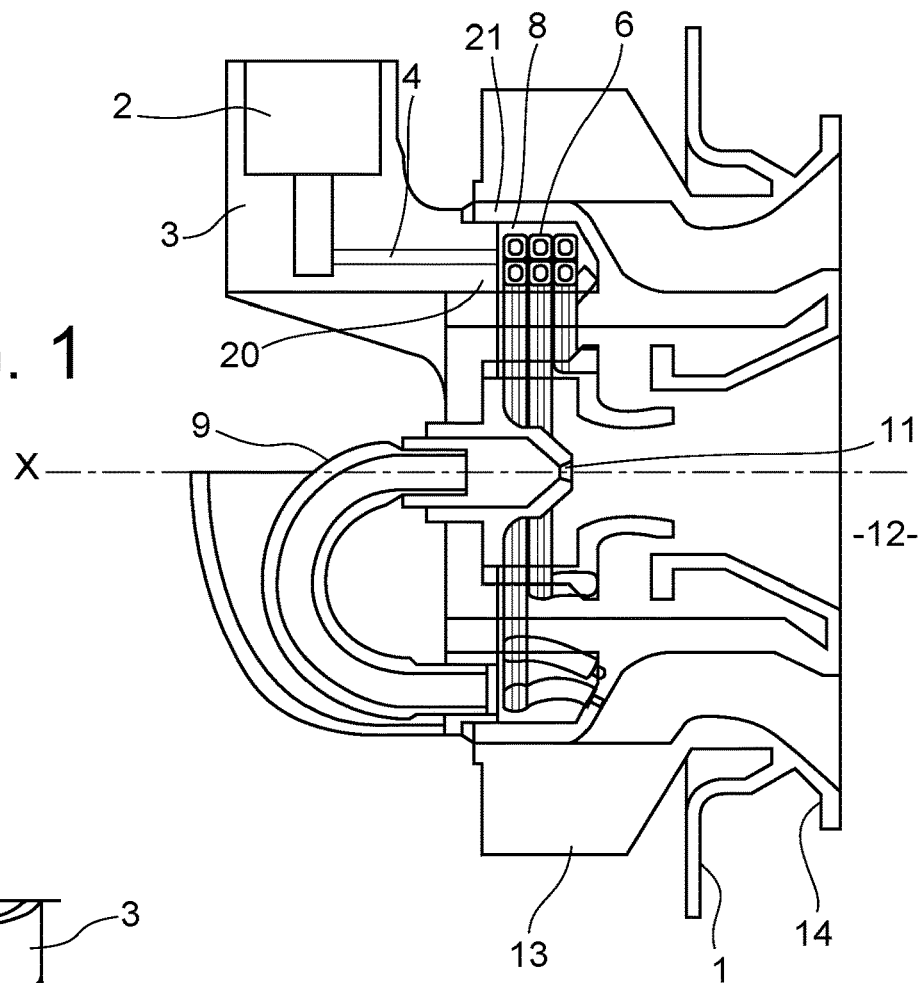
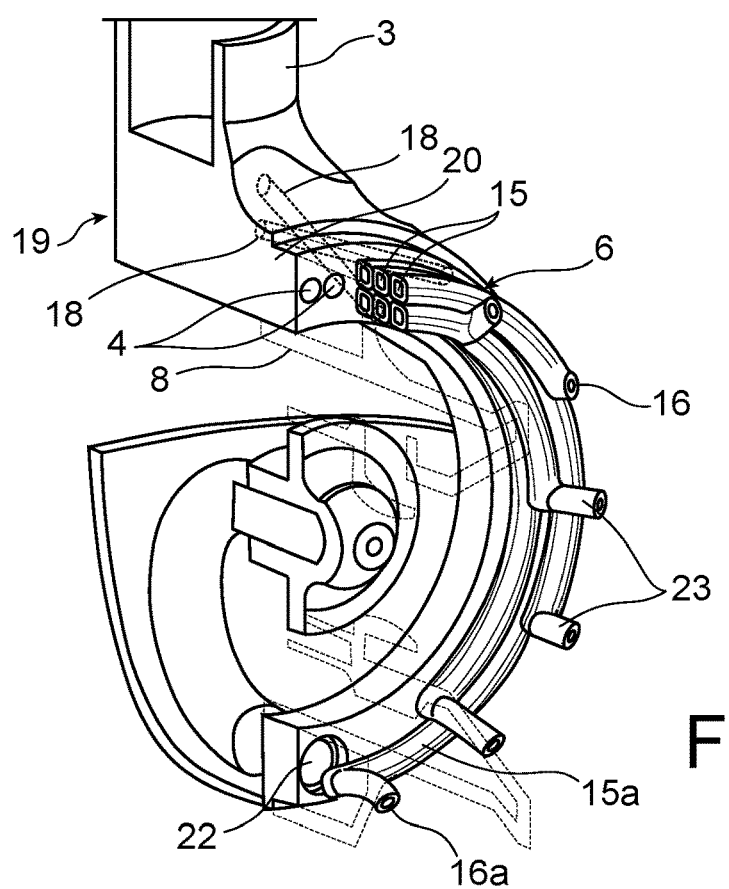

MULTIPOINT FUEL INJECTION DEVICE

This application claims priority from French Patent Application No. 18 56773, filed Jul. 20, 2018, the entire contents of which is hereby incorporated by reference herein.

The subject matter of the invention is a multipoint fuel injection device, designed for an aircraft engine.

Such devices offer the perspective of reducing the polluting emissions discharged by the engine, which depend both on the thermodynamic cycle and on the configuration of the combustion chamber. These polluting emissions include nitrogen oxides NOx, carbon monoxide CO, unburned fuel CHx, smoke emissions and fine particle emissions which are or will be regulated by standards.

Among the solutions making it possible to reduce polluting emissions, it is possible to resort to an injection including both a so-called pilot injection, used over the whole of the flight, and an injection used beyond idling speeds and for example during take-off, typically from 30% of the maximum speed, where a lean or sub-stoichiometric combustion takes place. The temperature of the flame is then low, which limits the formation of nitrogen oxides at these high speeds. The fuel injection system then typically includes a central region assigned to the pilot injection, and a peripheral injection surrounding the preceding assigned to this combustion beyond idling speeds. The peripheral injection into the combustion chamber takes place through a series of holes distributed on a crown, which explains why it is called "multipoint". These holes, which may be ten or so or several tens or so in number, are supplied in known designs by an annular cavity going completely round the crown and supplied by a supply conduit coming from the arm of the injector.

Such a device is described in the document FR 2996287 A1; the document FR 2919898 A1 may also be consulted, also conforming to the preceding description, but which has the particularity that the crown for conveying the fuel of the multipoint injection is surrounded by a cavity in which flows the fuel of the pilot injection. The risks of coking of the fuel of the multipoint injection while it is inactive are thereby avoided, thanks to a constant cooling procured by the fuel of the pilot injection.

Engines are being developed in which the injection system is of smaller volume, which would impose a reduction in section of the cavity of the crown in which flows the fuel intended for the multipoint injection. Increased head losses are then feared, which risk making the flow more difficult, deteriorating the uniformity of the injection flow rate through the different points, thus decreasing the combustion efficiency, potentially making it unstable and increasing the production of new polluting emissions.

It has thus been sought to improve injection systems including a multipoint injection, in order to better guarantee uniformity of flow rate through the injection holes, and thus a regular distribution of the fuel in the azimuth direction of the crown, including for small volume injection systems.

This fuel injection device for a combustion chamber of an aircraft engine includes a first, central, so-called pilot injection part, a second so-called multipoint injection part surrounding the pilot part, the multipoint part being connected to a fuel supply conduit and including holes for injecting fuel into the combustion chamber, characterised in that the multipoint part includes, between said injection holes and said supply conduit, a plurality of conduits parallel with each other and each connected to a respective injection hole, the conduits extending circumferentially around the pilot part over different angular sectors; a part of the parallel conduits being composed of joined and rigid tubes forming a unitary portion and manufactured by a material addition method.

By dividing in this way in an early manner the fuel into flow rates individually supplying each of the injection holes, upstream of the path where head losses can occur, this makes it possible to adjust the head losses undergone by the fuel towards each of the injection orifices, and thus the distribution of the total flow rate towards each of the conduits, so as to obtain uniformity of injection. But given the large number of lengths encountered in multipoint devices, it was difficult to easily find tubes having all the suitable characteristics. An aspect of the invention is thus that the manufacture of the conduits takes place by an additive method, the conduits then forming, at least over a part of the length, a unitary structure. Additive manufacturing has the great advantage of making it possible to construct without difficulty complex bundles of conduits of different lengths and which can also be different by their section or any other geometric or other parameter.

A subsidiary but important aspect of the invention relates to the ejection of fuel out of the conduits. In many cases, the parallel conduits will be connected to the holes by connecting tubes that will be oriented in a direction essentially identical to a central axis of the crown, and will thus form a more or less straight angle with the main portions of the conduits. It is then recommended that these connecting tubes have identical length over diameter ratios $$\frac{L}{D},$$

in order to obtain penetration depths of the fuel jets in the combustion chamber that are identical, here again to favour regularity of injection and combustion.

The parallel conduits envisaged here may typically have considerable lengths, which are however variable depending on the distance of their injection hole from the supply conduit outlet: the longest parallel conduits may have an extension of 135° at least, or even around 180° in the case, preferred for the invention, where the parallel conduits form two groups of which each extends into a respective angular half of the crown; all the circumference (apart from a small angular portion corresponding to a distribution chamber at the outlet of the supply conduit) may thus be occupied by these conduits.

The aim of the invention is attained if the parallel conduits are subject to identical head losses. Yet, head losses depend notably on the length of each of the conduits, but also their diameter. This may be attained by making the parallel conduits different to each other in such a way that their linear head loss (per unit of length) is inversely proportional to their length. This can be achieved in various ways by making the flow a little more difficult in the short conduits, for example if the parallel conduits have different sections, increasing for increasing values of the angular sectors; and notably with identical length over diameter ratios $$\frac{L}{D}$$

or instead, in plausible embodiments where the parallel conduits are connected to the holes by connecting tubes which are oriented in a direction essentially identical to a central axis of the crown, if the connecting tubes have identical length over diameter ratios.

The crown could be problematic to manufacture with conventional material removal methods, but it can be manufactured very well by an additive method. The crown may be included in another crown assigned to the supply with fuel of the pilot part, in order to be bathed by the fuel intended for the pilot part to maintain the fuel of the multipoint part below coking.

Figure 5:
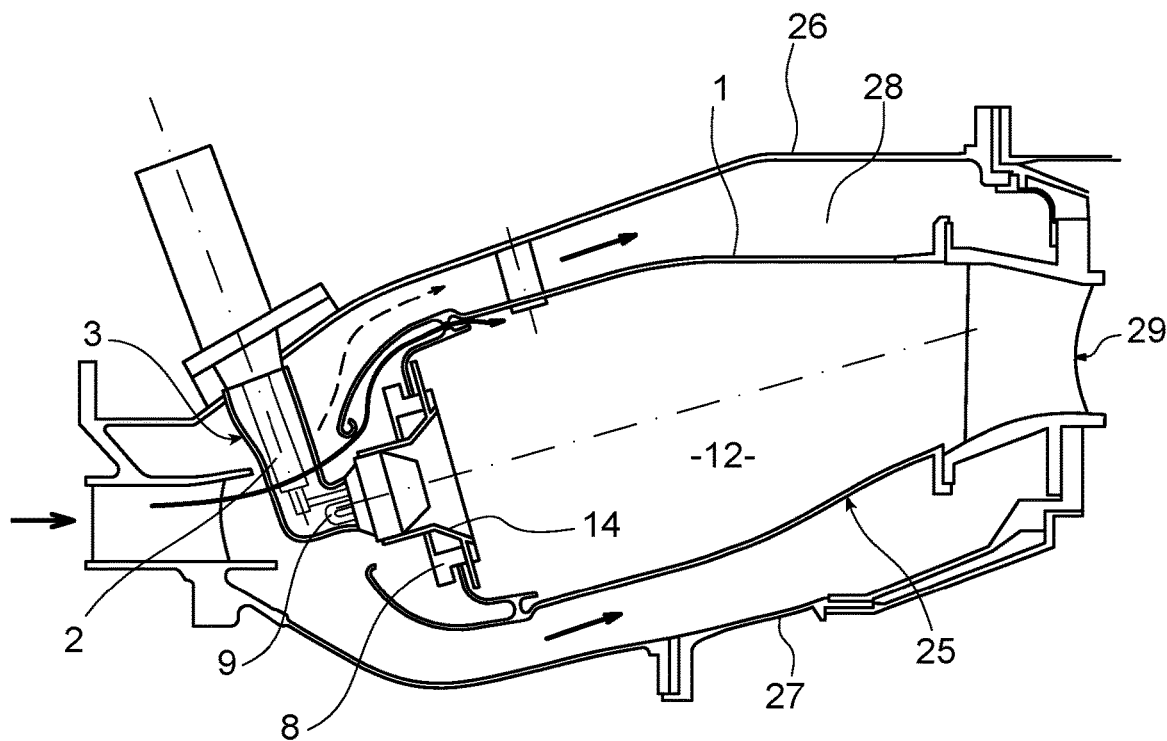
Figure 6:
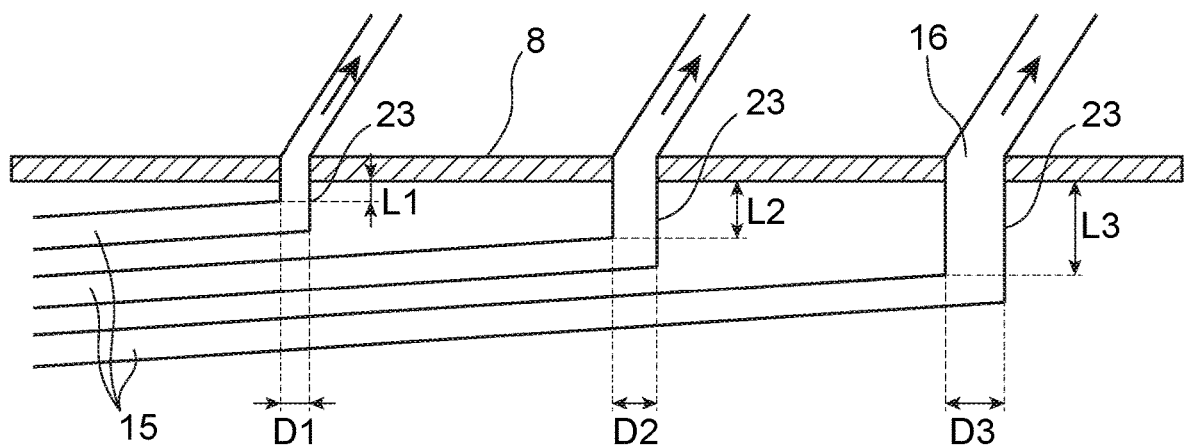

The invention will now be described more fully in relation to the comments of the following figures, which describe a purely illustrative particular embodiment thereof:

FIGS. 1, 2, 3 and 4 represent the device, respectively in median section, in partial perspective, in complete perspective, and from above;

FIG. 5 schematically illustrates the environment of the device including the combustion chamber;

and FIG. 6 is an enlargement of the end of a part of the multipoint injection tubes.

The injection device is established through a wall 1 of a combustion chamber 25. FIG. 5 schematically represents the combustion chamber 25 surrounded by the gas flow path 28 of the turbomachine of which a part surrounds the combustion chamber 25. The injection device emerges at the bottom of the combustion chamber 25, opposite the outlet 29 of the combustion chamber 25. A supply conduit 2 is at the centre of an injection arm 3, and it supplies with fuel a so-called multipoint injection part including a multipoint injection crown 6. The latter is arranged in a cavity 7 of an outer crown 8 which envelopes it and which is the seat of a permanent flow of fuel during flight, itself also supplied by the supply conduit 2, which supplies a so-called pilot injection part, including a pilot injection conduit 9 which ends in a pilot injection jet 11 at the centre of the device, directed towards the inner volume 12 of the combustion chamber. The injection device is supported by an envelope 13 that surrounds the crowns 6 and 8, is connected to the wall 1 and flares out into a lodge 14 towards the inner combustion volume 12. The pilot injection conduit 9 has a shape bent at 180° and extends into a region diametrically opposite to the supply conduit 2 with respect to a central axis X of the multipoint injection crown 6 and the outer crown 8, passing through the pilot injection jet 11 and horizontal in FIG. 1. This central axis X conventionally makes it possible to define axial, radial and tangential (or angular) directions, which will be used to describe the device.

The crown 6 is composed of two unitary portions, of which one is represented in a clearly visible manner in FIG. 2. Each unitary portion includes a group of juxtaposed and joined tubes 15 forming parallel conduits, which extend in the tangential direction of the injection device. The tubes 15 of the portion have however different lengths and stop at locations regularly distributed on the circumference of the multipoint injection crown 6 and which comprise multipoint injection holes 16. In the embodiment represented, this half of the multipoint injection crown 6 includes six tubes 15 and as many multipoint injection holes 16, of which one of them, noted 16a, is diametrically opposite to the supply conduit 2 and depends on a tube, noted 15a, of which the length—nearly 180° of angular extension—is greater. In this embodiment, the multipoint injection part includes eleven multipoint injection holes 16 in total, regularly distributed over the complete circumference of the multipoint injection crown 6, and the other half of the crown 6 may be virtually symmetrical thereto, except that there is no symmetric tube of the longest tube 15a (FIG. 3). The five tubes (in this embodiment) of the group of tubes of the unitary portion, not represented, of the multipoint injection crown 6 may have angular lengths respectively similar to those of the tubes 15 represented (the tube 15a being excluded), or not, a greater dissymmetry of the halves of the multipoint injection crown 6 then being accepted. It is thereby possible to obtain a device including an even or odd number of multipoint injection holes 16.

The outer crown 8 forms a continuous ring, but the multipoint injection crown 6 is limited by two walls 10 which separate its two portions and between which extend a distribution chamber 17 of low angular extension (at the most an interval between two multipoint injection holes 16). The supply conduit 2 emerges in the distribution chamber 17 by at least one supply tube 4 which prolongs it in the arm 3, and the tubes 15 also emerge in the distribution chamber 17 after having passed through the walls 10. Also, the fuel circulates freely from the supply conduit 2 to the multipoint injection holes 16 by spreading out in an equitable manner in the tubes 15. A valve, not represented, makes it possible however to stop this circulation at will, by closing the supply tube 4. The supply conduit 2 is provided with other supply tubes 18, which emerge in the outer crown 8 outside of the multipoint injection crown 6 of the two sides of the distribution chamber 17 and ensure the pilot injection of fuel.

The outer crown 8 includes an open side in front of an end piece 19 at the end of the arm 3 and on its side, and the supply tubes 4 and 18 pass through this end piece 19. The end piece 19 has a circular end 20 corresponding to this open side. When this circular end 20 is driven into a flange 21 projecting on the outer edge of the outer crown 8 towards the arm 3, a leak tight adjustment may be obtained. And the circular end 20 comprises a hole 22 diametrically opposite to the supply conduit 2, in which one end of the pilot injection conduit 9 is driven in, whereas the opposite end of the pilot injection conduit 9, which is bent, is adjusted on the pilot injection jet 11. The result is a circulation of fuel without obstacle from the two sides of the outer crown 8 around the multipoint injection crown 6 up to the pilot injection jet 11. Bathed by external fuel, the multipoint injection crown 6 escapes coking and the risks of clogging of the tubes 15 which could have appeared when the fuel that is present therein stagnates while the multipoint injection is stopped. The fuel circulating in the pilot injection and notably around the multipoint injection crown 6 remains at a temperature of less than 100° C., much less than that of the ambient air, and it thus maintains a sufficient exchange of heat to ensure this protection against coking.

A uniform distribution of fuel may be hoped for in the different tubes 15 of the two parts of the multipoint injection crown 6, in accordance with the objective of the invention which is to ensure an equal flow rate in the different injection holes 16 thanks to the early division of the multipoint injection flow. It is possible if necessary to construct the tubes 15 with different geometric characteristics, in order to level out there in head losses and to reinforce this desired flow rate equality: it is thus possible to envisage compensating the effects of the differences in lengths between the tubes 15, for example by constructing them with different sections, greater for the longest tubes 15, or greater sectional irregularities or other obstacles in the shortest tubes 15, since the head losses are proportional to the widths of the conduits, and inversely proportional to their diameter. A great freedom in design is available to do this, which is made possible by manufacturing the multipoint injection crown 6 by a material addition method, of a part with the outer crown 8 or separately. Such a manufacturing facility does not exist with conventional construction methods, where tubes would be connected independently to a distribution device, since the choice of the diameters would then be limited, and the distribution device provided with different connections, more complicated to construct. It is to be noted that head losses may also be caused in the shortest tubes 15 by irregularities of section or other obstacles, but it is simpler and surer to construct them with a judiciously chosen constant section, with identical length over diameter ratios $$\frac{L}{D}.$$

The tubes 15 are connected to the multipoint injection holes 16 by connecting tubes 23 which extend essentially in the direction of the central axis of the multipoint injection crown 6 and form a bend with the tubes 15.

A dimensioning rule that can favourably be applied thereto is to assign them a ratio $$\frac{L}{D}$$

(length, between each multipoint injection hole 16 and the junction bend to the respective tube 15, over diameter: FIG. 6) that is identical $$\left(\frac{L_1}{D_1} = \frac{L_2}{D_2} = \frac{L_3}{D_3}\right),$$

in order that the penetration heights of the fuel jets in the inner volume 12 of the combustion chamber 25 are also identical and that a regular injection is thus obtained. This rule is all the more justified if the tubes 5 are grouped together into bundles in the outer crown 8 at different depths under the multipoint injection holes 16.

The respect of these length/diameter ratios $$\frac{L}{D}$$

also produces identical head losses in the connecting tubes 23 when they exist.

The invention claimed is:

1. A fuel injection device for a combustion chamber of an aircraft engine, including a first, central, pilot injection part defining a central axis of the fuel injection device, a second, multipoint injection part surrounding the first, central, pilot injection part, the second, multipoint injection part being connected to a fuel supply conduit and including injection holes for injecting a fuel into the combustion chamber, wherein the second, multipoint injection part includes, between said injection holes and said supply conduit, at least one group of conduits comprising a plurality of conduits, said conduits of the plurality of conduits being juxtaposed to each other, and conveying separate fuel flows from a common fuel supply chamber to a single respective injection hole of the injection holes, the plurality of conduits extending circumferentially around the first, central, pilot injection part over angular sectors having different angular extensions; the plurality of conduits are composed of joined and rigid tubes forming a unitary portion and is manufactured by a material addition method; the fuel injection device also including an outer crown for supplying the first, central, pilot injection part with the fuel, said conduits of the plurality of conduits of the second, multipoint injection part being comprised in said outer crown, the second, multipoint injection part being arranged in a cavity of said outer crown which envelopes the second, multipoint injection part and which is a seat of a permanent flow of the fuel during flight so that the second, multipoint injection part is bathed by the fuel intended for the first, central, pilot injection part to maintain the fuel of the multipoint injection part below coking, wherein each tube of the joined, rigid tubes extends from the common fuel supply chamber and terminates at the respective injection hole, wherein at least two tubes of the joined, rigid tubes extend in a same circumferential direction.

2. The fuel injection device according to claim 1, wherein each group of the at least one group of conduits form a portion of a second crown.

3. The fuel injection device according to claim 2, wherein the joined, rigid tubes at the injection holes comprise connecting tubes which are oriented in a direction essentially identical to the central axis of the fuel injection device.

4. The fuel injection device according to claim 3, wherein the connecting tubes have identical length over diameter ratios, $$\frac{L}{D}.$$

5. The fuel injection device according to claim 2, wherein the at least one group of conduits comprises two groups of conduits, of which each group extends into a respective angular half of the second crown.

6. The fuel injection device according to claim 1, wherein at least one of the conduits of the plurality of conduits extends over a respective angular sector of the angular sectors of at least 135°.

7. The fuel injection device according to claim 1, wherein the fuel supply conduit emerges in the common fuel supply chamber of the second, multipoint injection part, to which are connected all the conduits of the plurality of conduits of the at least one group of conduits.

8. The fuel injection device according to claim 1, wherein the separate fuel flows in all of the plurality of conduits undergo equal head losses.

\* \* \* \* \*